United States Patent [19]

Akashi

[11] 4,170,617
[45] Oct. 9, 1979

[54] METHOD OF FORMING A BOTTOM STOP ON A SLIDE FASTENER

[75] Inventor: Shunji Akashi, Kurobe, Japan

[73] Assignee: Yoshida Kogyo K.K., Tokyo, Japan

[21] Appl. No.: 947,766

[22] Filed: Oct. 2, 1978

[30] Foreign Application Priority Data

Oct. 18, 1977 [JP] Japan .................................. 52-124702

[51] Int. Cl.$^2$ .......................... B29D 5/00; B29C 27/08
[52] U.S. Cl. ...................................... 264/23; 156/73.2; 264/248; 264/320; 425/174.2; 425/814; 425/DIG. 34
[58] Field of Search .................. 264/23, 248; 425/814, 425/174.2, DIG. 34; 156/173.1, 173.2

[56] References Cited

U.S. PATENT DOCUMENTS

| | | | |
|---|---|---|---|
| 3,190,779 | 6/1965 | Porepp | 156/66 |
| 3,263,291 | 8/1966 | Taylor | 425/814 |
| 3,813,459 | 5/1974 | Potin | 264/23 |
| 3,839,128 | 10/1974 | Arai | 156/66 |
| 3,874,963 | 4/1975 | Barger | 264/23 |
| 4,054,973 | 10/1977 | Moertel et al. | 156/66 |
| 4,115,489 | 9/1978 | MacFee | 264/23 |

*Primary Examiner*—W. E. Hoag
*Attorney, Agent, or Firm*—Bucknam and Archer

[57] ABSTRACT

In a slide fastener having continuous coupling elements of the helicoidal-coil type, a bottom stop is formed by imparting ultrasonic vibrations to the several interengaged lowermost scoops of the coupling elements, while these scoops are being compressed from opposite lateral sides thereof to move the coupling heads of each element into abutment against a core received in the other element. The ultrasonic vibrations are applied by the horn of an ultrasonic welding assembly holding the interengaged lowermost scoops from both front and rear sides of the fastener. The invention is also applicable to a slide fastener having zigzag-type continuous coupling elements.

5 Claims, 4 Drawing Figures

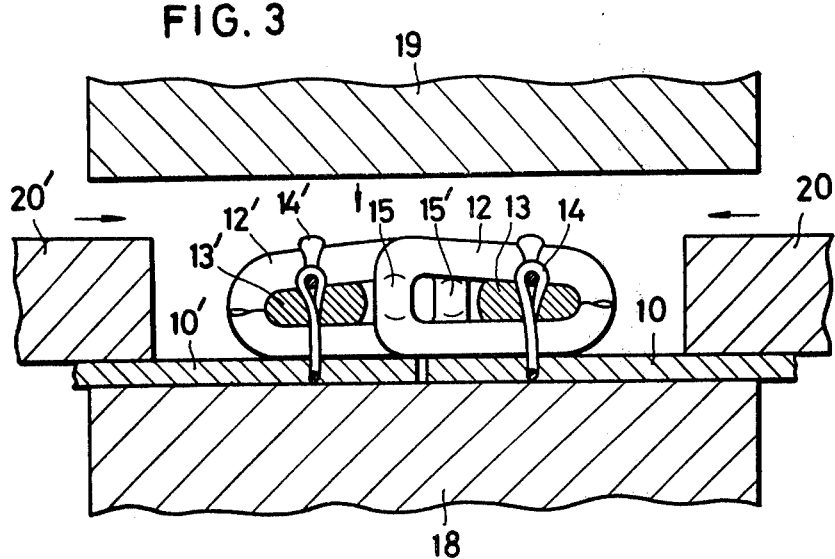
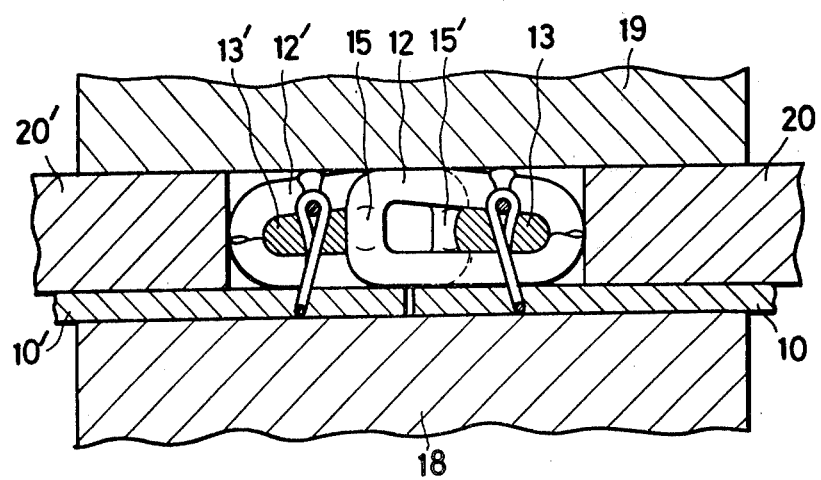

METHOD OF FORMING A BOTTOM STOP ON A SLIDE FASTENER

BACKGROUND OF THE INVENTION

1. Field of the Invention

This invention relates to a method of forming a bottom stop on a slide fastener having coupling elements fabricated from continuous filaments, such as those of the helicoidal-coil or zigzag type. More specifically, the invention concerns a method of forming a bottom stop by ultrasonically welding together several interengaged lowermost scoops of the continuous coupling elements.

2. Prior Art

Bottom stops have been suggested which are formed by fusing or welding together several interengaged lowermost scoops of continuous coupling elements on stringer or carrier tapes, as by vibrating the interengaged scoops at ultrasonic frequencies, as disclosed for example in U.S. Pat. No. 3,263,291. Such bottom stops, as herefore made, are unsatisfactory for the following reason.

Coupling elements in general are capable of withstanding crosswise tensile stresses by virtue of their interengaged heads. The interengaged coupling elements of the helicoidal-coil and zigzag configurations, however, are susceptible to ready displacement when subjected to crosswise compressive stresses. This is because gaps exist between the coupling heads of each continuous coupling element and a filler (i.e., a cord or like core in the case of coil type coupling elements and a longitudinal stringer tape edge in the case of zigzag type coupling elements) received in the other continuous coupling element.

From the standpoint of this invention, the scoops of the continuous coupling elements can be considered to be somewhat loosely interengaged by reason of the existence of the above noted gaps. Thus, when vibrated ultrasonically, the several interengaged lowermost scoops of the coupling elements do not develop sufficient frictional heat to coalesce into a firmly united bottom stop. The efficiency of the ultrasonic welding operation is also poor.

SUMMARY OF THE INVENTION

It is among the objects of this invention to provide an improved method of efficiently welding or fusing several interengaged lowermost scoops of a pair of continuous coupling elements into a highly coherent bottom stop by imparting ultrasonic vibrations thereto.

According to the method of this invention, stated in brief, at least a preselected number of lowermost scoops of each continuous coupling element of a slide fastener are interengaged with the corresponding number of lowermost scoops of the other coupling element. The interengaged lowermost scoops of the coupling elements are then compressed from opposite lateral sides thereof, thereby moving the coupling heads of the interengaged scoops of each coupling element into abutment against a filler (as hereinafter defined) received in the other coupling element. Simultaneously, while the interengaged scoops are being compressed as above, ultrasonic vibrations are imparted thereto for welding them together.

The term "filler" as used herein and in the claims appended hereto should be understood to mean a core passing through the turns or undulations of each continuous coupling element when the latter is in the form of a helicoidal coil, and the longitudinal edge portion of a stringer tape received between the U-shaped scoops of each continuous coupling element when the latter is of a zigzag configuration. Thus, the method of this invention is applicable to slide fasteners having continuous coupling elements of both helicoidal-coil and zigzag types.

Preferably, the preselected numbers of lowermost scoops of the continuous coupling elements are further supported, from both front and rear sides of the fastener, by members of an ultrasonic welding assembly, through one of which ultrasonic vibrations are imparted to the interengaged lowermost scoops. In this manner the interengaged lowermost scoops can be efficiently welded together into a highly coherent bottom stop, without undergoing any substantial deformation.

The above and other objects, features and advantages of this invention and the manner of attaining them will become more clearly apparent, and the invention itself will best be understood, from the following description and appended claims taken together with the accompanying drawings.

BRIEF DESCRIPTION OF THE DRAWINGS

FIG. 3 is a sectional view schematically illustrating means for forming the bottom stop on the slide fastener of FIGS. 1 and 2 by the inventive method, the means being shown in a state before formation of the bottom stop; and FIG. 4 is a view similar to FIG. 3 except that the means are shown in a state during formation of the bottom stop.

DETAILED DESCRIPTION

Figure 1:
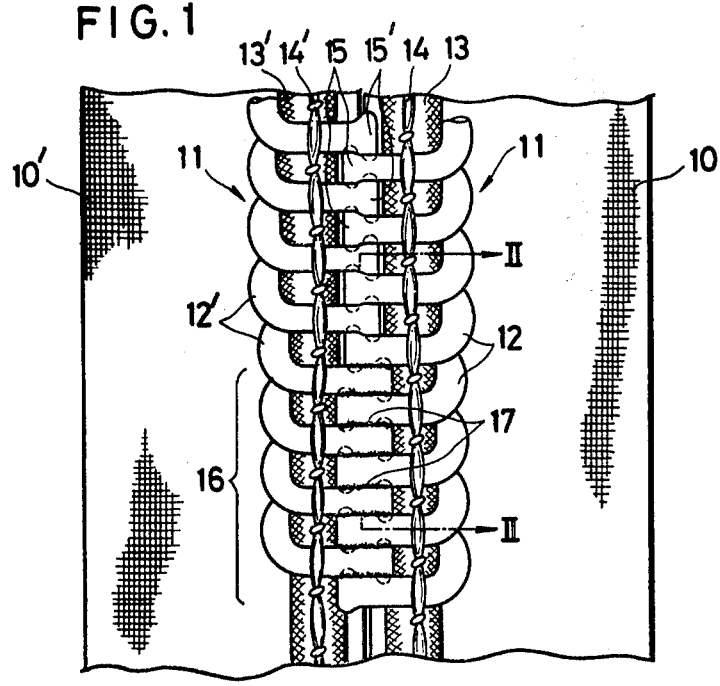
FIG. 1 is a partial front view of a slide fastener having continuous coupling elements of the helicoidal-coil type, the slide fastener including a bottom stop formed by the method of this invention.
Figure 2:
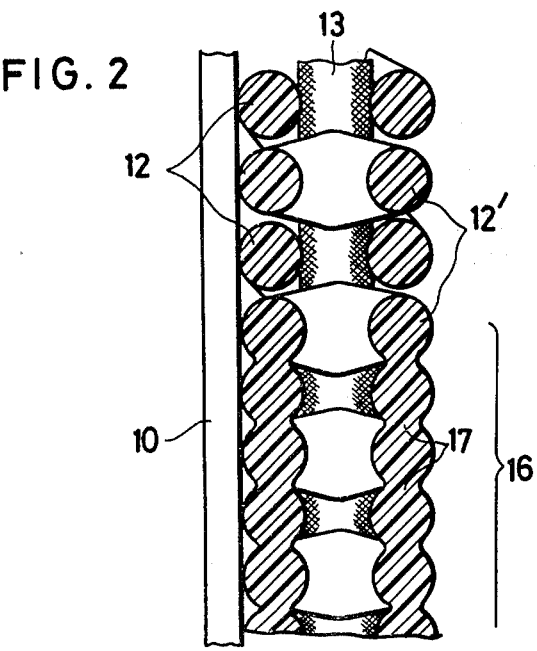
FIG. 2 is an enlarged sectional view taken along the line II—II in FIG. 1.

The method of this invention will now be descrived in detail as adapted specifically for the formation of a bottom stop on a slide fastener having continuous coupling elements of the helicoidal-coil type illustrated in FIGS. 1 and 2 of the accompanying drawings. The illustrated slide fastener comprises a pair of stringer or carrier tapes 10 and 10', and a pair of continuous coupling elements 11 and 11' extending along the confronting longitudinal edges of the stringer tapes.

Each in the form of a helicoidal coil, the continuous coupling elements 11 and 11' are formed to provide rows of constantly spaced-apart scoops 12 and 12' for mating interengagement with each other. Cores or fillers 13 and 13', as in the form of cords, extend through the turns or undulations of the respective coupling elements 11 and 11'. These coupling elements 11 and 11' together with the core cords 13 and 13' are fastened to the confronting longitudinal edges of the stringer tapes 10 and 10' by rows of stitches 14 and 14' traversing the rows of scoops 12 and 12'.

The rows of scoops 12 and 12' are formed to include coupling heads 15 and 15' projecting beyond the confronting edges of the stringer tapes 10 and 10'. When a slider (not shown) is moved along the continuous coupling elements 11 and 11' in the fastener closing direction, the rows of scoops 12 and 12' are interengaged as shown in FIG. 1, with the coupling heads 15 or 15' of each coupling element caught behind the coupling heads of the other element. It will be observed from FIG. 1 that when the slide fastener is thus closed, gaps exist between the coupling heads 15 or 15' of each of the continuous coupling element 11 and 11' and the core cord 13 or 13' received in the other coupling element.

In FIGS. 1 and 2 is also shown a bottom stop 16 formed by the method of this invention. For the formation of this bottom stop 16, a preselected number of, four for example, lowermost scoops 12 or 12' of each continuous coupling element 11 or 11' are engaged with the corresponding number of lowermost scoops of the other coupling element, and the interengaged lowermost scoops are ultrasonically welded or fused to each other at 17, in the manner set forth in detail hereinbelow.

FIGS. 3 and 4 are illustrative of the means for use in the practice of the inventive method, and of the way the means are used to form the bottom stop 16 of FIGS. 1 and 2. Shown at 18 is part of a horn which is included in an ultrasonic wave generator and which serves as a "sonotrode" of an ultrasonic welding assembly. The slide fastener of FIGS. 1 and 2 is placed upon the horn 18, with at least the preselected numbers of lowermost scoops 12 and 12' of the continuous coupling elements 11 and 11' interengaged as shown.

The other member of the ultrasonic welding assembly is an anvil 19 disposed over the slide fastener on the horn 18 for movement toward and away from the latter. The horn 18 and anvil 19 coact to ultrasonically welding together the interengaged lowermost scoops 12 and 12' of the slide fastener, besides serving the additional purpose of substantially immovably holding the interengaged lowermost scoops from both front and rear sides of the fastener.

According to a feature of this invention, a pair of pressers 20 and 20' are disposed on the opposite lateral sides of the slide fastener on the horn 18 for movement toward and away from each other, in a direction parallel to the plane of the stringer tapes 10 and 10' and in sliding contact with the latter. Upon movement of the pressers 20 and 20' toward each other, the interengaged lowermost scoops 12 and 12' are compressed, in such a way that the coupling heads 15 or 15' of each element 11 or 11' are pressed against the core cord 13 or 13' received in the other coupling element, as clearly seen in FIG. 4.

Ultrasonic vibrations are imparted to the preselected numbers of interengaged lowermost scoops 12 and 12' of the slide fastener through the horn or sonotrode 18, while these scoops are supported from both front and rear sides of the fastener in a direction substantially perpendicularly to the plane of the stringer tapes 10, 10' by the members 18 and 19 of the ultrasonic welding assembly and are further compressed from their opposite lateral sides by the pair of pressers 20 and 20'. Thus vibrated at an ultrasonic frequency, the interengaged lowermost scoops 12 and 12' of the slide fastener are welded or fused together, as at 17 in FIGS. 1 and 2, owing to the heat generated frictionally by their contacting surface portions. At the same time, the coupling heads 15, 15' are fused integrally with the core cord 13, 13'. The desired bottom stop 16 is thus completed.

It will be appreciated that the frictional heat generated as above by the interengaged lowermost scoops 12 and 12' is much higher, at a given ultrasonic frequency of vibration, than in the case where they are not compressed from the opposite lateral sides. The bottom stop 16 can therefore be formed efficiently and with a high degree of coherency. As an additional advantage, the interengaged lowermost scoops 12 and 12' are not appreciably deformed when ultrasonically welded together by the method of this invention, so that the bottom stop 16 is favorable in appearance, too.

The specific example of the inventive method shown and described hereinbefore is meant purely to illustrate or explain and not to impose limitations upon the invention, since numerous modifications will readily occur to persons skilled in the art. For example, the anvil 19 and the pair of pressers 20 and 20' may be integrated; that is, the anvil may have formed in its bottom surface a groove having a width slightly less than the total width of the pair of continuous coupling elements 11 and 11' engaged with each other, for performing by itself the functions of both anvil 19 as illustrated and pair of pressers 20 and 20'. This and other modifications or changes within the usual knowledge of the specialists are considered to fall within the scope of this invention as sought to be defined by the following claims.

What is claimed is:

1. A method of forming a bottom stop on a slide fastener of the type having a pair of stringer tapes each carrying a continuous coupling element forming a row of scoops for mating engagement with the complementary row of scoops formed by the continuous coupling element on the other stringer tape, each coupling element having a filler received therein, which method comprises the steps of:
   (a) interengaging at least a preselected number of lowermost scoops of each coupling element with the corresponding number of lowermost scoops of the other coupling element:
   (b) compressing the interengaged lowermost scoops from opposite lateral sides thereof, in a direction parallel to the plane of the stringer tapes, thereby causing the coupling heads of the interengaged lowermost scoops of each coupling element to be pressed against the filler received in the other coupling element; and
   (c) fusing the interengaged lowermost scoops of the coupling elements for welding them together into a bottom stop.

2. A method according to claim 1, said interengaged lowermost scoops of the coupling elements being fused by imparting ultrasonic vibrations thereto.

3. A method according to claim 1, said coupling heads of the interengaged lowermost scoops being fused integrally with the fillers in the coupling elements when said lowermost scoops are fused together.

4. A method according to claim 1, further including the step of substantially immovably holding the interengaged lowermost scoops of the coupling elements from both front and rear sides of the slide fastener in a direction substantially perpendicular to said first-named direction.

5. A method according to claim 1, utilizing an ultrasonic welding assembly having a horn and an anvil opposite to the horn, said interengaged lowermost scoops of the coupling elements being fused by imparting thereto ultrasonic vibrations from the horn, said interengaged lowermost scoops of the coupling elements being substantially immovably held between the horn and the anvil from both front and rear sides of the slide fastener in a direction substantially perpendicular to said first-named direction.

* * * * *